No. 892,641. PATENTED JULY 7, 1908.
G. F. BARRON.
FAUCET.
APPLICATION FILED MAY 1, 1907.
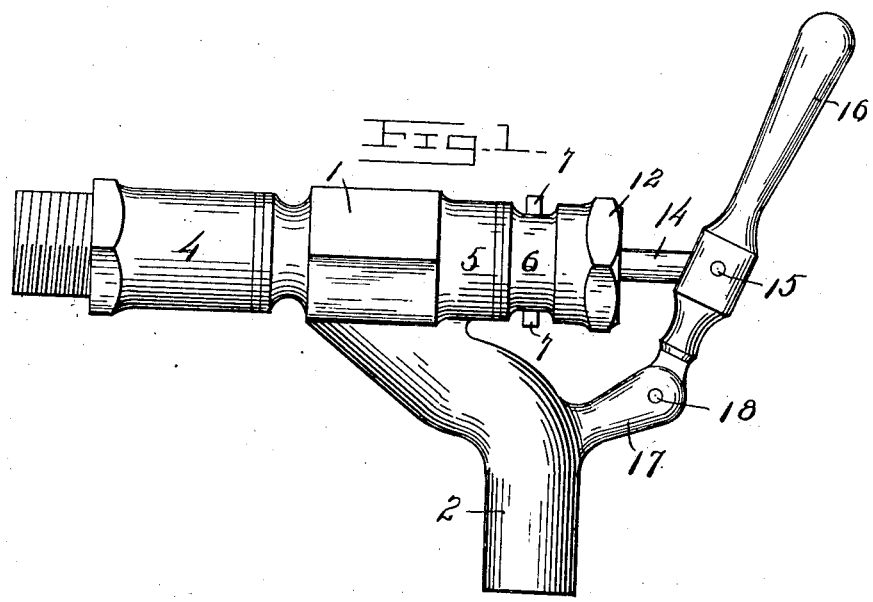
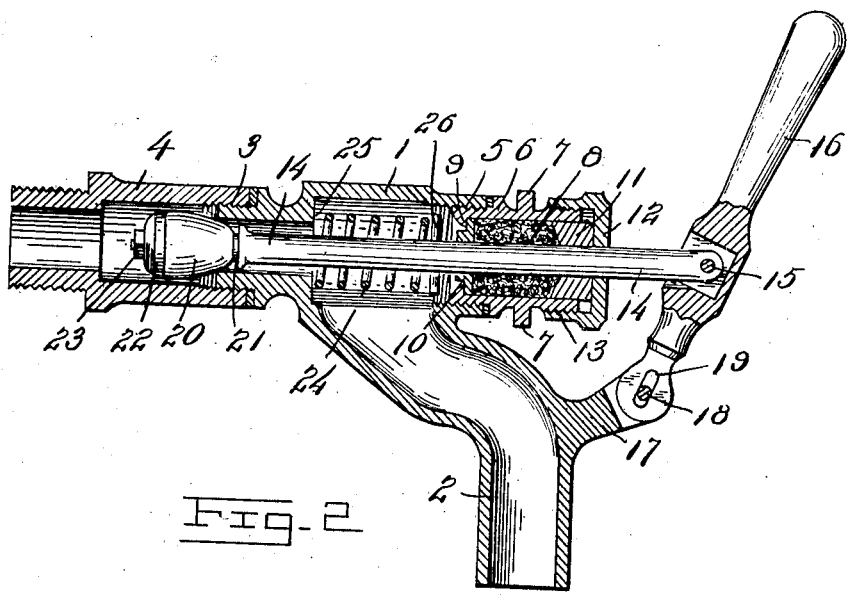
Witnesses
L. L. Armstrong
A. M. Whitmore
Inventor
George F. Barron,
By
E. B. Whitmore,
Attorney

UNITED STATES PATENT OFFICE.

GEORGE F. BARRON, OF PALMYRA, NEW YORK.

FAUCET.

No. 892,641.　　　Specification of Letters Patent.　　　Patented July 7, 1908.

Application filed May 1, 1907. Serial No. 371,299.

*To all whom it may concern:*

Be it known that I, GEORGE F. BARRON, of Palmyra, in the county of Wayne and State of New York, have invented a new and useful Improvement in Faucets, which improvement is fully set forth in the following specification and shown in the accompanying drawings.

This invention relates to certain new and useful improvements in faucets of that general class in which the pressure of the water tends to automatically close the valve.

The present invention has for its objects, among others, to provide an improved faucet of this type in which the valve stem is provided with two bearings near the operating lever, so that the stem shall move exactly longitudinally when shifted to open or close the valve, whereby the valve and stem are always kept coaxial with the body. The valve is thus prevented from having lateral motions with reference to its seat, and thus the wear which is unavoidable when the valve has such lateral motions with reference to its seat, is avoided and consequent leak prevented.

A further object is to render the valve readily accessible for the purpose of repairs.

My construction is such that by merely unscrewing the body of the faucet from the coupling, joined to the tank or other body, the valve is at once uncovered and the faucet removed.

I provide an improved form of valve; it is conical in form and of long taper, and is formed of a suitable yielding material, as india rubber. Being drawn to its seat in a longitudinal direction without lateral motions it forms a wedge action and the tapered walls of the valve insure that it shall always be firmly and squarely seated upon its seat, automatically taking up for any wear that may occur from long usage. A spring is provided which acts with the water pressure to normally close the valve.

Other objects and advantages of the invention will hereinafter appear and the novel features thereof will be specifically defined by the appended claims.

The invention is clearly illustrated in the accompanying drawings, which, with the numerals of reference marked thereon, form a part of this specification, and in which Figure 1 is a side elevation of my improved faucet. Fig. 2 is a substantially central longitudinal section through the same.

Like numerals of reference indicate like parts in the different views.

Referring to the drawings 1 designates the shell or body portion of the faucet, having the discharge nozzle 2 and the exteriorly screw threaded nipple 3 adapted to be screwed into the coupling 4 of usual construction, which latter is designed to be attached to the tank or other body, not shown, in the usual manner. The other end of this shell is formed with an interiorly screw threaded socket or end 5 into which is designed to be screwed one end of the stuffing box 6 which is shown as provided with projecting portions 7, as pins, on opposite sides for the purpose of receiving a spanner wrench in turning the stuffing box body into and out of the main body or shell 1. This stuffing box is filled with some suitable stuffing material as fibrous packing, seen at 8, and at its inner end is provided with an interior shoulder 9 against which seats a bearing disk 10 which is provided with an annular flange as seen in Fig. 2 for this purpose. At the opposite end of the stuffing box body is fitted therein a compression disk 11 the inner face of which may be concave as seen in Fig. 2 to receive the end of the packing; its outer end is designed to be engaged by the end of the cap 12 which is provided with an interiorly threaded flange 13 engaging threads on the outer end of the body of the stuffing box. Screwing up of this cap compresses the packing when necessary.

14 is the valve stem. It extends longitudinally through the shell and through the stuffing box, as shown in Fig. 2. It has two bearings, near the lever-end thereof, one in the disk 10, and the other in the compression disk 11. Its outer end which passes through the end of the cap 12 is pivotally connected as at 15 with the actuating lever 16 which is pivotally mounted at one end within the bifurcated lug 17 extending at an angle from the discharge nozzle 2, the pivot being shown at 18. The pivot 18 works in an elongated slot 19 in the fulcrum end of the lever, as seen in Fig. 2, so that when the lever is swung forward or back to open or close the valve the pin or pivot through the lever and the valve stem shall move truly longitudinally with reference to the axis of the body so as to prevent binding in any way.

The inner end of the valve stem is screw threaded and is designed to receive the valve 20, a shoulder 21 being shown in Fig. 2 to prevent the undue inward movement of the valve on the stem. This valve is made preferably of india rubber and is conical in form, of long taper and is placed on the inner end of the stem, after which a cap 22 is placed on the stem against the larger end of the valve, and then a nut 23 is screwed onto the threaded end of the stem and the valve is thus securely yet detachably retained on the stem.

24 is a spring within the shell 1, finding one point of resistance against the shoulder 25 within the shell and the other against the pin or the like 26 on or passed through the stem within the shell, all as seen clearly in Fig. 2. By this construction the spring acts with the pressure of the water to normally keep the valve closed against its seat. To draw water the lever is pushed toward the end of the shell when the spring is compressed and the valve forced from its seat. When pressure is removed, the spring, together with the water pressure seats the valve.

The bearing of the stem in the disks 10 and 11 near the outer end of the stem, serves to keep the stem coaxial in its movements and lateral motions thereof and consequently of the valve are prevented, with the result that the valve is always drawn squarely to its seat and uneven wear and consequent leakage is prevented. By merely unscrewing the shell from the coupling the valve, which is exposed beyond the end of the shell, is readily accessible, and by simply unscrewing the nut 23 the valve can be removed and a new one easily put in its place. The power of the spring may be varied in accordance with the water pressure in connection with which my improved faucet is to be used.

Modifications in detail may be resorted to without departing from the spirit of the invention or sacrificing any of its advantages.

What is claimed as new is:—

1. In a faucet, a shell having a discharge nozzle and a screw threaded socket, a stuffing box engaging said socket, a cap to said stuffing box, disks within said stuffing box, a packing between said disks, a stem having a bearing in said cap and disks and passed through said packing, a valve on said stem, a pivoted lever for moving said stem in one direction and means for automatically moving it in the opposite direction.

2. In a faucet, a shell having a discharge nozzle and a screw threaded socket, a stuffing box engaging said socket, a cap to said stuffing box, disks within said stuffing box, a packing between said disks, a stem having a bearing in said cap and disks and passed through said packing, a valve on said stem, a pivoted lever for moving said stem in one direction, and a spring for moving it in the opposite direction, said lever having limited play at its pivot.

In witness whereof, I have hereunto set my hand this 27th day of April, 1907, in the presence of two subscribing witnesses.

GEORGE F. BARRON.

Witnesses:
   JULIUS S. CLEVELAND,
   HENRY D. RUNTERMAN.